Patented July 6, 1943

2,323,397

UNITED STATES PATENT OFFICE 2,323,397

ORGANIC MERCURY COMPOUND

William H. Hill, Mount Lebanon, Pa., assignor to American Cyanamid Company, New York, N. Y., a corporation of Maine No Drawing. Application May 9, 1941, Serial No. 392,731

7 Claims. (Cl. 260—431)

This invention relates to the preparation of certain new organic mercury compounds, especially mercury amidines. More particularly it embraces the production of such mercury amidines as are obtained by reacting guanylurea, guanylthiourea, biguanide or guanidine with a mercury compound.

It is an object of this invention to provide an efficient and simple process for the preparation of these products. A further object is to obtain such products in a conveniently utilizable form. Still other and additional objects as well as uses for the products as herein prepared will become apparent from the following detailed description.

In general, the invention in its broadest aspect contemplates the preparation of mercury amidines by reacting one of the above-mentioned compounds, or their alkyl, aryl or aralkyl substitution products containing a replaceable hydrogen attached to a nitrogen atom, with a mercury compound. Among the mercury compounds which may be used for effecting this reaction are the mercury salts, such as the mercuric halides, mercuric chloride, mercuric bromide and the like, mercuric acetate, mercuric nitrate, and mercuric citrate, among other soluble mercuric salts. The soluble reactive mercury compounds may also react in the form of their oxides and hydroxides or substituted hydroxides, i. e., phenyl mercury hydroxide. Moreover, such mercury compounds as phenyl mercury acetate, phenyl mercury nitrate, and the like may be used.

Briefly, while the reaction may be carried out in any suitable manner, with or without external heating, it has been found advantageous in a preferred embodiment of the invention to render the reaction medium strongly alkaline in order to accelerate the reaction. Thus in a particular embodiment, suitable bases for this purpose are sodium hydroxide, potassium hydroxide, and the like, while mercuric chloride, because of its ready availability, is used as the reacting mercury compound. The mercuric chloride is added to the reaction medium containing guanylurea, guanylthiourea, biguanide or guanidine as long as a white precipitate continues to be formed. The end point of the reaction is indicated by the formation of a yellow precipitate upon further addition of mercuric chloride.

The new compounds of this invention find a very wide range of uses. For example they are useful as germicides, bactericides, and for similar and other therapeutic purposes. They can be used as preservatives for wood or as coatings for ship bottoms. They also find use in the immunizing of seed grain against smut and bunt diseases and as fungicides. In addition they may be used for disinfecting purposes and for the sterilizing of dental and medical instruments.

The following examples are merely illustrative embodiments of the invention and give further detailed descriptions of some of the representative organic mercury compounds included herein. The scope of the invention however is not to be deemed as limited by the examples except as defined in the claims.

Example 1

30.4 g. of guanylurea neutral sulfate were dissolved in 100 cc. of water and the solution was rendered strongly alkaline by the addition of 20 cc. of a 50% solution of sodium hydroxide. The addition of 400 cc. of a saturated solution of mercuric chloride gave a white precipitate of mercuric guanylurea which was readily separated by filtration. The clear filtrate was rendered more strongly alkaline and the absence of a rose-colored precipitate upon the addition of a little 10% copper sulfate solution to the filtrate is an indication that the guanylurea sulfate has been totally converted to mercuric guanylurea.

Example 2

30 g. of biguanide neutral sulfate were dissolved in 50 cc. of water and when reacted as described above in Example 1 in an alkaline medium with mercuric chloride, yielded a white precipitate of mercuric biguanide which was readily separated by filtration.

Example 3

In a similar manner, 32.4 g. of guanidine neutral sulfate when dissolved in 125 cc. of water and reacted in an alkaline medium with mercuric chloride yielded a white precipitate of mercuric guanidine which was separated by filtration.

Example 4

42.4 g. of diamyl biguanide acid sulfate was dissolved in 150 cc. of water and 60 cc. of a 20% solution of sodium hydroxide was added. A white suspension consisting of the free base, diamyl biguanide, formed in the aqueous solution. The addition of 200 cc. of a hot concentrated solution of mercuric chloride (i. e., at 70° C.) caused the precipitate to become heavier and curd-like. Excessive quantities of mercuric chloride were not added, hence no yellow colored precipitate, indicating the presence of mercuric oxide, was obtained. The product was heated to boiling, filtered on a Buchner funnel and the filter cake washed with water. The product, diamyl mercury biguanide, weighing 50 grams, was soluble in butanol and was highly useful in preventing the molding of urea-formaldehyde lacquers.

In the above examples, by choosing the proper acid radical which is to enter the organic mercury compound, the water solubility of the resultant product can be greatly increased. Similarly, still other organic mercury compounds which have improved oil solubility and hence find use as inhibitors of marine growths in ship bottom paints as well as other marine paints can be prepared. By carrying out these reactions while using biguanide sulfonic acid or guanidine sulfonic acid as the amidine reactant, products are obtained which are capable of forming water solutions containing relatively high concentrations of the desired products. Such aqueous solutions are invariably potent and effective insecticides, fungicides, germicides and the like.

The compounds prepared according to the present invention are further characterized in that they have highly desirable properties when incorporated in fungicidal compositions. They yield highly effective dusting compositions which are particularly advantageous for the control of saprophytic and parasitic fungi growths on such grains as whaet, corn, barley and the like. Infestations by such growths are an enormous economic problem particularly since the available fungicides and phytocides result in but a very poor control. In use, a seed grain disinfectant is prepared by dispersing from 1 to 3% of one of the above mercury compounds in a suitable dusting powder such as talc, gypsum, bentonite, wood flour, and the like. The organic mercury compounds of this invention, particularly when adsorbed on such inert fillers, are highly effective for immunizing seed grains against smut and bunt diseases. Incorporated in dusting powders they have enhanced fungicidal activity and are effective for the treatment of parasitic diseases in small grains and for the control of fungus diseases in cotton seed.

Although mercuric chloride has been used as the more common mercury containing reactant in the above examples, it is to be understood that any soluble reactive mercury compound is equally effective. Thus, mercuric acetate, mercuric lactate, phenyl mercury acetate, mercuric tartrate, citrate, and other soluble mercury salts as well as mercuric hydroxide, phenyl mercuric hydroxide, mercuric oxide and the like can also be used to advantage. Likewise, instead of guanylurea, guanylthiourea and its many salts may be used as a reactant to obtain a mercury containing guanylthiourea.

Various other substituted amidines such as the amyl, phenyl, tolyl and the like, among other alkyl, aryl and aralkyl substituted guanylureas, guanylthioureas, guanidines and biguanides which still contain a replaceable hydrogen attached to a nitrogen atom may be reacted with the various soluble reactive mercury compounds above given. Among such amidines there may be specifically cited, only by way of example, for the guanylureas: 1-methyl guanylurea, diphenyl guanylurea, 4-phenyl guanylurea, 4-methylphenyl guanylurea, and the like. Further examples of substituted guanylthioureas include such as the following: 4-methyl guanylthiourea, 4-ethyl guanylthiourea, 4-phenyl guanylthiourea, 4-isobutyl guanylthiourea, 4-allyl guanylthiourea, 4-isoamyl guanylthiourea, 4-phenylethyl guanylthiourea, 4-methoxyphenyl guanylthiourea, p-ethoxyphenyl guanylthiourea, and the like. Such substituted biguanides as the following may likewise be reacted with mercury compounds in accordance with this invention: mono- and di-substituted biguanides, 1-ethyl biguanide, 1-methyl biguanide, 1-dodecyl biguanide, mixed alkyl and aryl substituted biguanides, i. e., 1-methyl-1-phenyl biguanide, 1-butyl-1-phenyl biguanide, 1-ethyl-1-phenyl biguanide, and the like, ortho tolyl and di-ortho tolyl biguanide, 1,1'-dibenzyl biguanide, 1,5-dibenzyl biguanide, and the like. Among the guanidines, the following may be cited: mono-, di- and tri-lauryl guanidine, mono-, di-, and tri-octadecyl guanidine, benzyl guanidine, mono-, di- and tri-phenyl guanidine, monoformyl and other monoacyl guanidines, diacetyl guanidine, triamino guanidine, di-methyl guanidine, di-ethyl guanidine, mono-, di- and tri-propyl guanidine, monostearyl guanidine, distearyl guanidine, benzo-guanidine, toluo-guanidine, isobutyl guanidine, pentadecyl guanidine, di-ortho tolyl guanidine, 1,1'-symmetrical di-phenyl guanidine, 1,2-unsymmetrical di-phenyl guanidine, 1,1',2-unsymmetrical tri-phenyl guanidine, 1,2,3-symmetrical tri-phenyl guanidine, 1,1' dibenzyl guanidine, cyclohexyl guanidine, symmetrical and unsymmetrical dicyclohexyl guanidine and the like.

It is to be understood that the examples given are merely illustrative and not limitative of the invention which may be variously otherwise embodied within the scope of the appended claims.

I claim:

1. The method of preparing organic mercury amidines which comprises reacting at a room temperature and in aqueous solution a soluble mercury salt in alkaline medium with a compound selected from the group consisting of guanylurea, guanylthiourea and their alkyl, aryl and aralkyl substitution products containing a replaceable hydrogen attached to a nitrogen atom.

2. The method of claim 1 in which the mercury salt is a mercury halide.

3. The method of claim 1 in which the mercury salt is mercuric chloride.

4. Mercuric guanlyurea.

5. The method of preparing organic mercury amidines which comprises reacting a soluble mercury halide in an alkaline aqueous medium with a guanylurea containing at least one replaceable hydrogen attached to a nitrogen atom.

6. The method of preparing organic mercury amidines which comprises reacting mercury chloride in an alkaline aqueous solution with a guanylurea containing at least one replaceable hydrogen attached to a nitrogen atom.

7. The method of preparing organic mercury amidines which comprises reacting mercury chloride in an aqueous alkaline medium with a guanylurea containing at least one replaceable hydrogen attached to a nitrogen atom.

WILLIAM H. HILL.